United States Patent [19]

Pearl et al.

[11] Patent Number: 5,128,037
[45] Date of Patent: Jul. 7, 1992

[54] SPIRAL WOUND FILTRATION MEMBRANE CARTRIDGE

[75] Inventors: Steven R. Pearl, Nashua, N.H.; Peter M. Dansky, Lynnfield, Mass.

[73] Assignee: Millipore Corporation, Bedford, Mass.

[21] Appl. No.: 634,843

[22] Filed: Dec. 27, 1990

[51] Int. Cl.$^5$ .............................................. B01D 63/00
[52] U.S. Cl. .................... 210/321.74; 210/321.83; 210/433.1; 210/450; 210/321.76
[58] Field of Search ............. 210/500.23, 450, 321.74, 210/321.83, 321.61, 232, 321.76, 433.1; 55/158

[56] References Cited

U.S. PATENT DOCUMENTS

| | | | |
|---|---|---|---|
| 4,301,013 | 11/1981 | Setti et al. ........................ | 210/321.83 |
| 4,548,714 | 10/1985 | Kissuan, Jr. et al. ............... | 210/232 |
| 4,842,736 | 6/1989 | Bray et al. ....................... | 210/321.61 |
| 4,872,990 | 10/1989 | Van Wijk ......................... | 210/321.83 |
| 4,874,405 | 10/1989 | Minhas ............................ | 35/158 |
| 4,906,372 | 3/1990 | Hopkins .......................... | 210/321.83 |

Primary Examiner—Robert A. Dawson
Assistant Examiner—Ana Fortuna
Attorney, Agent, or Firm—Andrew T. Karnakis; Paul J. Cook

[57] ABSTRACT

A spiral wound filtration cartridge construction is provided which includes a cartridge positioned within a solid outer cylinder which, in turn is positioned within a solid housing. Fluid flow within the space between the outer cylinder and housing is controlled by an end plate construction. The rigid solid end plate construction includes outer peripheral holes, the sizes and number of which are set to determine by-pass flow.

6 Claims, 5 Drawing Sheets

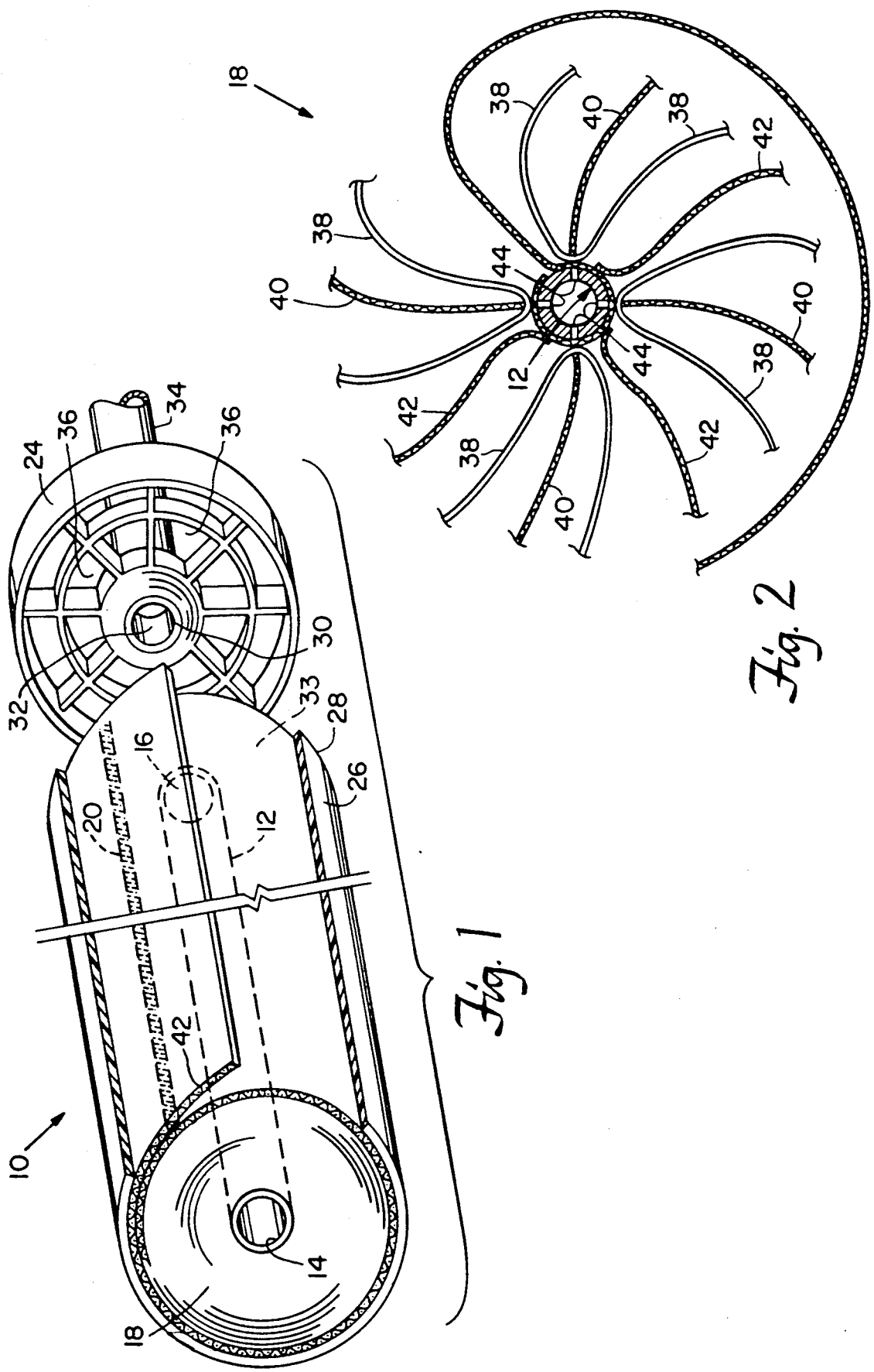

SPIRAL WOUND FILTRATION MEMBRANE CARTRIDGE

BACKGROUND OF THE INVENTION

This invention relates to a spiral wound filtration cartridge construction utilized in fluid separation processes such as reverse osmosis or ultrafiltration. More particularly, this invention relates to a spiral wound filtration cartridge construction having a partial feed bypass means which prevents fluid stagnation within and around the cartridge during use.

Prior to the present invention, spiral wound filtration cartridges have been provided comprising a centrally positioned tube about which are wound membrane sheets and suitable permeate spacers and feed spacers. The membrane sheets are V shaped and the feed spacers are positioned within the shaped membrane while the permeate spacers are positioned outside of the V shaped membranes. The feed spacers promote passage of feed fluid into the V shaped membrane and the permeate spacers promote permeate flow from outside the V-shaped membrane into holes through the walls of the centrally positioned conduit for recovery. The feed passes axially through the spiral wound membrane cartridge and retentate is recovered from the end of the cartridge opposite the end at which the feed is introduced. The filtration cartridge is held within a cylindrically shaped housing to provide mechanical strength to the cartridge during use.

It has been proposed to provide a controlled by pass of feed fluid within the space between the housing and the outside surface of the cartridge in order to prevent bacterial growth during use caused by clogging of the cartridge with retentate. U.S. Pat. No. 4,301,013 discloses the use of a tight fitting open mesh within the space between the cartridge and the housing to provide the desired by-pass flow. It has also been proposed in U.S Pat. No. 4,548,714 to wrap the cartridge with a leaf of the feed spacer to provide for fluid flow around the cartridge. It has also been proposed in U.S. Pat. No. 4,906,372 to utilize a seamless porous rigid sleeve within the housing to separate the cartridge from the housing and to provide for feed bypass. These cartridges are difficult to produce with the requisite tolerance needed to permit their use in the field, particularly when it is desired to change the cartridge within the housing. That is, these cartridge and housing arrangements are difficult to replace in the field since each cartridge-housing arrangement varies in size and shape.

It has also been proposed to render the cartridge more uniform in size by wrapping them with an adhesive tape as disclosed in U.S. Pat. No. 3,966,616 or with wound glass filament bonded with epoxy or by heat shrinking a sleeve about the cartridge. The use of tape or bonded filaments is undesirable since the tape seam or filaments retain solids in the feed thereby causing dead space or stagnation areas and resultant bacterial growth. The use of a heat shrink wrapping also is undesirable since the cartridges formed therewith are inconsistent in size and shape, have limited strength and the wrap has a tendency to slip off. It has also been proposed to surround the cartridge with a flexible sealing gasket to effect a seal between the outer housing and the cartridge. Small holes are provided through the flexible gasket to effect fluid flow between the outer housing and the cartridge. This arrangement is undesirable because the holes become deformed or blocked during use under high pressure.

Accordingly, it would be desirable to provide a filtration cartridge construction which affords a controlled feed by-pass means to maintain the construction clean during use. It also would be desirable to provide a filtration cartridge construction which can be easily utilized in the field to permit cartridge replacement when needed. It would also be desirable to provide a construction wherein the by pass of feed fluid can be controlled within narrow tolerances.

SUMMARY OF THE INVENTION

This invention provides a spiral wound filtration cartridge construction wherein a spiral wound filtration cartridge is positioned within a rigid solid cylindrical outer tube which, in turn, is positioned within a solid cylindrical housing. The filtration cartridge is formed by spirally winding one of a plurality of V-shaped filtration membranes, porous feed screens and porous permeate screens about a central tube having holes which are in selective fluid communication with the permeate screens. The filtration cartridge is wrapped about its entire outside surface with a fluid permeable layer such as the permeate screen or feed screen and is tightly fit within the outer tube. The outer tube, in turn, its fit within the housing. One end of the outer tube is provided with a fluid feed means. A second end of the outer tube is provided with a retentate recovery means. One or both ends are provided with permeate recovery means. The fluid feed means delivers feed fluid to the cartridge and to a controlled by-pass path comprising holes within a rigid solid surface to the space between the outer tube and the housing. The outer tube and the fluid feed means permit construction of the portion of the cartridge apparatus that fits into the outer tube in a controlled manufacturing environment so that the size and shape of this portion of the apparatus can be controlled easily. This, in turn, provides ease of cartridge replacement in the field.

BRIEF DESCRIPTION OF THE DRAWINGS

FIG. 1 is a partial cross sectional view of the cartridge apparatus of this invention without the fluid feed means cartridge.

FIG. 2 is a cross-sectional view of the filtration cartridge prior to being spirally wound.

DESCRIPTION OF SPECIFIC EMBODIMENTS

Figure 3:
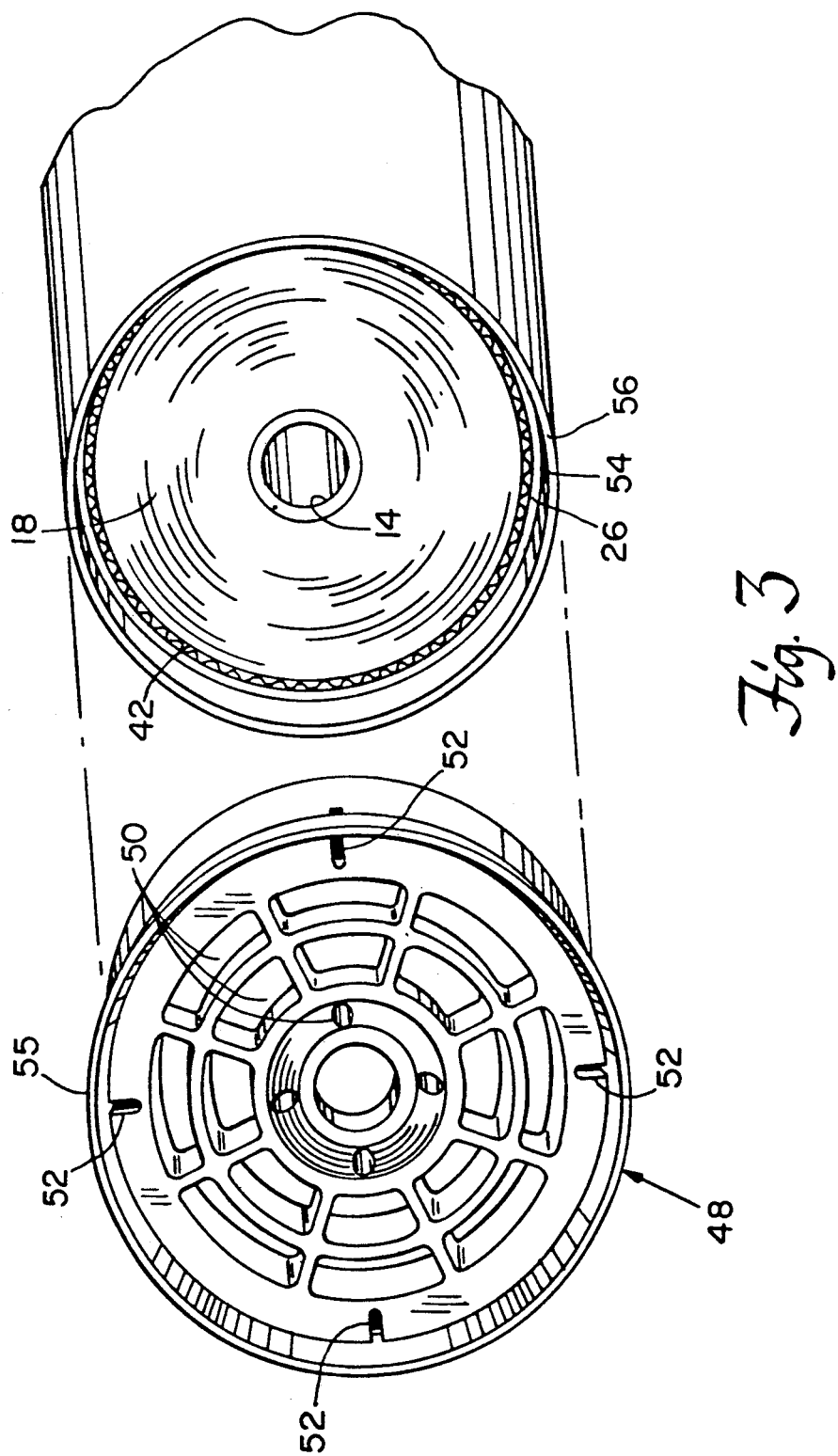
FIG. 3 is an exploded view of the fluid feed plate and filtration cartridge of this invention.
Figure 4:
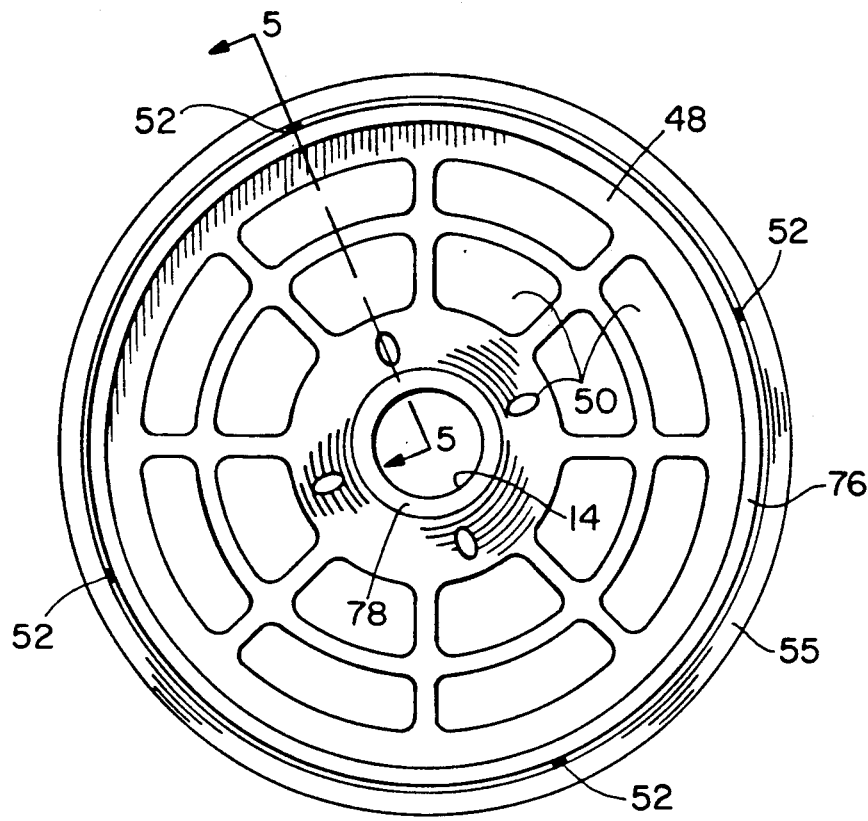
FIG. 4 is a bottom view of the fluid feed plate of this invention.

Referring to FIG. 1, the spiral wound apparatus of this invention 10 (excluding the outer housing and fluid feed means) includes a central tube 12 having an exit 14 and an exit 16 for recovering permeate from the apparatus 10. Optionally, one of the exits 14 or 16 can be blocked so that permeate is recovered only from one exit 14 or 16. The spiral wound portion 18 is comprised of the elements shown in FIG. 2 which will be described herein below. The spiral wound portion 18 includes an axial seal 20 which serves to prevent retentate and permeate form mixing. An end plate 24 is sealed to rigid solid outer tube 26 about the periphery 28 and to the periphery of exit 16 at the inner periphery 30 of end plate 24. The end plate 24 is not required for use in this invention. Exit 32 is in fluid communication with central tube 12 and permeate recovery conduit 34. Retentate exits form spiral surface 33 of spiral cartridge 18 through exit holes 36 in end plate 24 and is recovered. The cartridge 18 is enclosed in permeate screen 42 so as to provide a porous spacing between the spiral wound cartridge 18 and outer tube 26. If desired, the cartridge can be enclosed by a feed screen 40 or with any porous sheet such as cylindrical screen. However, it is preferred to utilize the permeate screen 42 to wrap the outside surface of cartridge 18 because the permeate screens 42 typically are denser than the feed screen 40 which reduces flow and therefore waste. Also, the permeate screens 42 are attached to central tube 12 and to the end adhesive 20 which reduces or eliminate screen slippage. The end adhesive 20 prevents feed fluid in screen 40 from mixing with permeate produced within cartridge 18.

Referring to FIG. 2, an unwound cartridge 18 is depicted showing the central tube 12 surrounded by a plurality of V shaped membranes 38, feed screens 40 are positioned with in the membranes 38 and permeate screens 42 are positioned outside the membranes 38. The lateral edges of the permeate screens 42 at the end of the cartridge adjacent the fluid feed means are sealed to the adjacent membranes 38 so as to prevent feed fluid from entering the permeate screens 42 such as disclosed in U.S. Pat. No. 3,966,616 which is incorporated herein by reference. The V shaped membranes can be any fluid permeable membrane such as an ultrafiltration, reverse osmosis or a microporous membrane. The membranes 38 and screens 40 and 42 are spirally wound about the central tube 12 with the outside wrapping of the cartridge 18 comprising the elongated permeate screen 42 shown in FIG. 2. However, the outside wrapping can be formed from a plurality of overlapping permeate or feed screens and can be more than one screen in thickness if desired. The permeate screen 42 are attached to central tube 12. The cartridge 18 then is sealed axially by adhesive 20 so as to prevent feed fluid from entering the working portion of the permeate screens 42. The outside wrap of permeate screen 42 provides a means for feed fluid to enter it and to clean the space between the outer surface of the spiral wound cartridge 18 and the inner surface of outer tube 26. The permeate screen 42 typically is made of woven fabric such as polypropylene or polyester or knitted fabric such as Tricot. The feed screen 40 typically is made from polypropylene or polyethylene extruded netting or woven fabric. In use, feed fluid enters the feed screens 40 at one spiral wound surface of cartridge 18. Permeate passes through the membranes 38 into permeate screens 42, through holes 44 and out of tube 12 and through recovery conduit 34. During manufacture, the spiral wound cartridge 18 is inserted into outer tube 26. The solid outer tube 26 provides a constant size and shape for the cartridge 18 so that it can be replaced easily within a cylindrical housing.

Referring to FIGS. 3, 4, 5 and 6, the end plate 48 includes a plurality of peripheral holes 50 through which feed passes into the cartridge 18. The central hole 14 provides an outlet for permeate produced within cartridge 18. The solid rigid end plate 48 includes a plurality of outer peripheral holes 52 which provide fluid communication for feed flow into the space 54 between outer tube 26 and housing 56 (See FIG. 6). The size and number of the holes 52 controls the rate of by-pass flow. Since end plate 48 is formed of a solid rigid material such as the polymeric composition or a metal, the holes 52 do not deform during use. Flexible gasket 55 is positioned about the periphery of and within a peripheral slot of end plate 48. Under the pressure of incoming fluid feed, the gasket seals against the inner surface of housing 56 to effect fluid flow through end plate 48 and to prevent by-pass flow other than that directed through the holes 52. The gasket 55 prevents flow other than through the holes 52 so that fluid flow within space 54 is accurately controlled. The fluid flow within space 54 prevents clogging and bacterial growth within the space 54.

Figure 6:
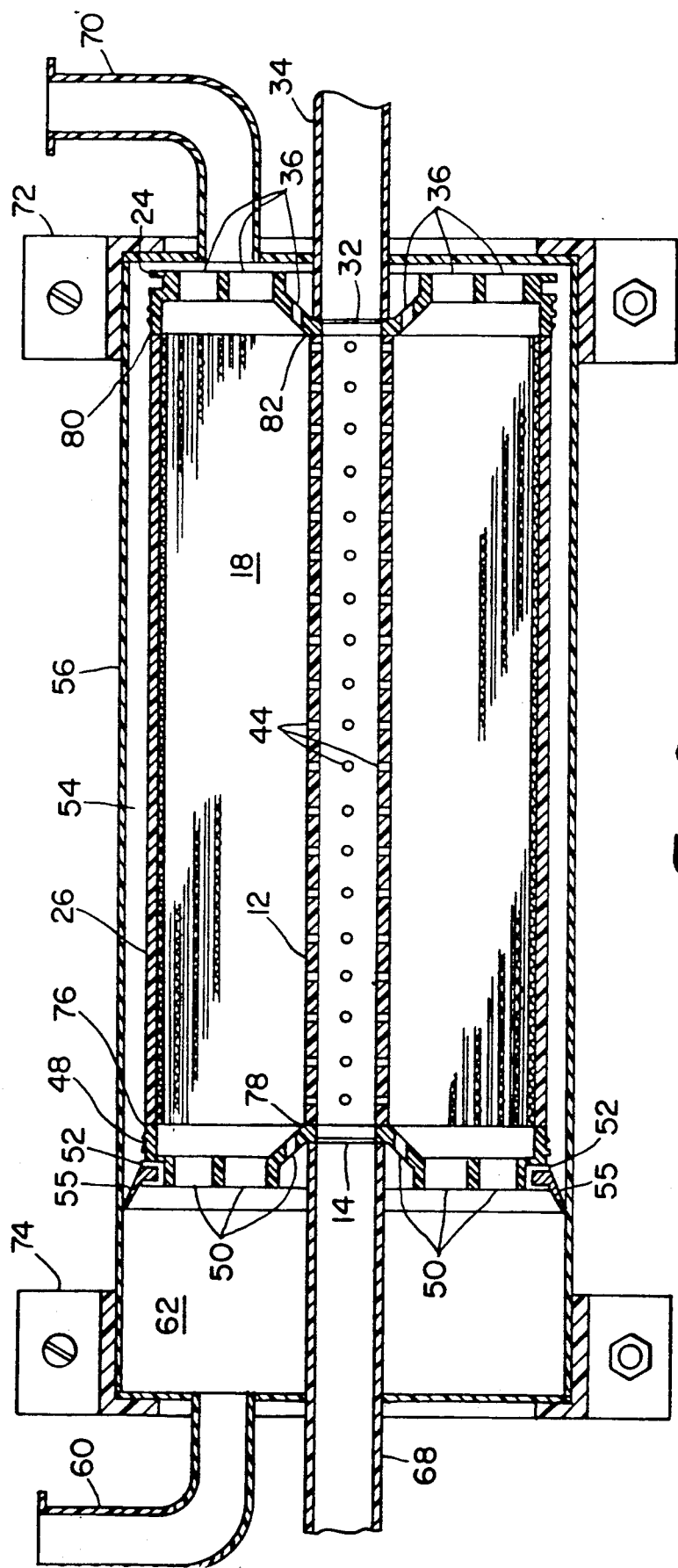
FIG. 6 is a cross sectional view of the apparatus of this invention.

As shown in FIG. 6, fluid feed passes through conduit 60, into manifold 62 and into cartridge 18 through holes 50. Permeate produced within cartridge 18 passes through holes 44 of inner tube 12 and permeate exits conduits 34 and 68. Retentate passes from cartridge 18, through holes 36 in end plate 24 and out retentate conduit 70. The end plate 48 is bonded at its inner periphery to outer tube 26 and inner tube 12 at surfaces 76 and 78. End plate 24 is bonded to outer tube 26 and inner tube 12 at surfaces 80 and 82. End plate 24 is not required in the apparatus of this invention. In addition, the end plate 48 with bypass holes 52 can be positioned at the downstream end of cartridge 18 to replace end plate 24 if desired. When it is desired to replace the unitary construction comprising the rigid solid outer tube 26, cartridge 18, end plate 24 and end plate 48, clamps 72 and 74 are released and the unitary construction is replaced with another unitary construction within cylindrical housing 56. As set forth above, either outlet 14 or outlet 32 can be sealed so that permeate is recovered from one exit rather than two exits.

Figure 5:
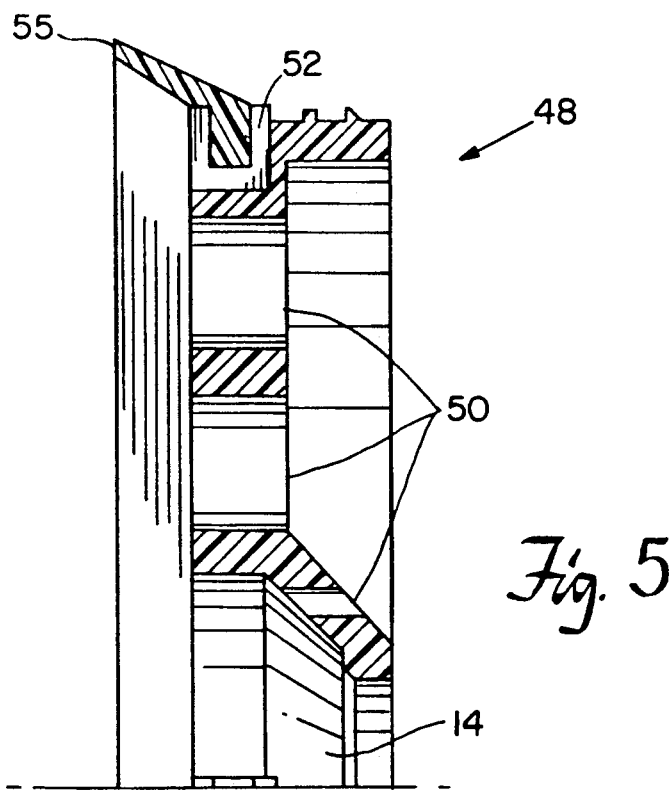
FIG. 5 is a partial cross sectional view of the fluid feed plate of FIGS. 3 and 4.
Figure 7:
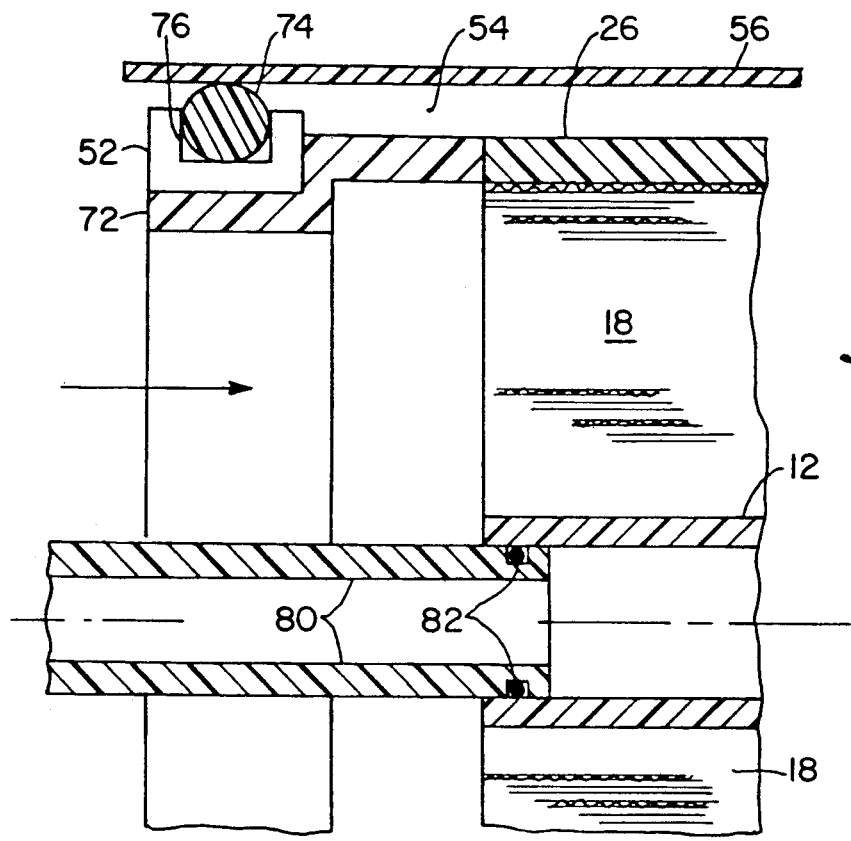
FIG. 7 is a partial cross-sectional view of an alternative embodiment of this invention utilizing an O ring seal.

Referring to FIG. 7, a construction of this invention is shown wherein sealing is effected with a flexible gasket comprising an O ring rather than the chevron shaped gasket 55 shown in FIGS. 5 and 6. A ring shaped rigid solid end plate 72 is provided with spaced through holes 52. An O ring 74 is positioned within a peripheral slot 76 of end plate 72. The end plate 72 is bonded to outer tube 26 which encloses spiral wound cartridge 18. Conduit 80 is sealed within conduit 12 by means of O ring 82. Feed flow is effected through holes 52 into space 54 between outer tube 26 and housing 56.

Figure 8:
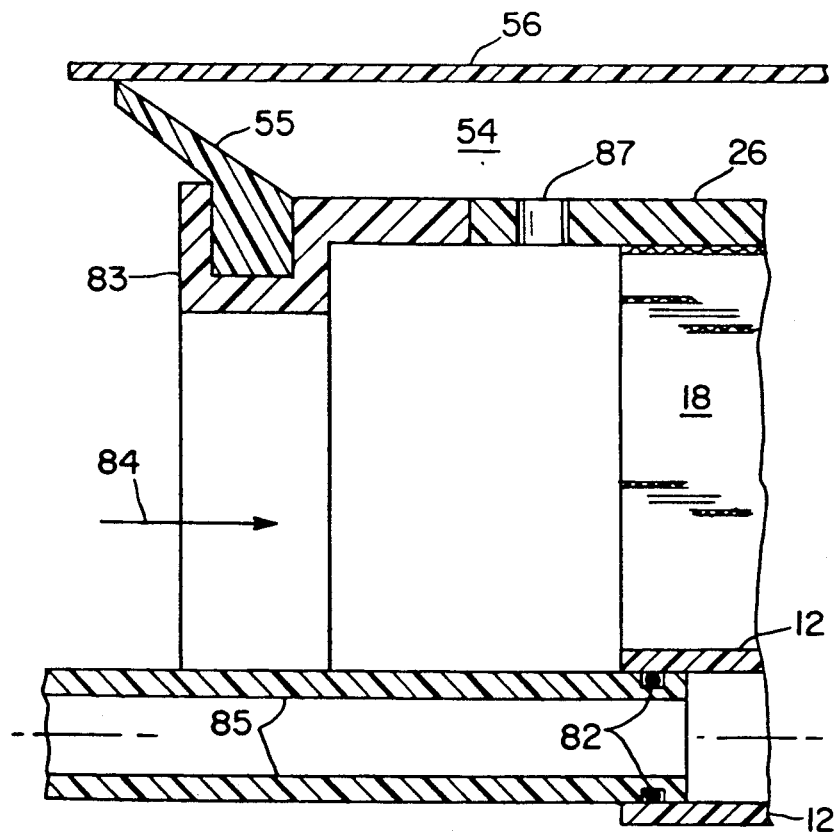
FIG. 8 is a partial cross-sectional view of an alternative embodiment of this invention utilizing a rigid solid ring support for a sealing gasket.

Referring to FIG. 8, a construction of this invention is shown wherein sealing is effected with a chevron shaped gasket and a ring-shaped end plate 83 rather than an end plate having a plurality of holes and by-pass holes 87 are positioned within rigid solid outer tube 26 rather than the end plate 80. Permeate conduit 85 is positioned within central tube 12 and is sealed therein by means of O ring 82. Feed fluid passes into cartridge 18 in the direction shown by arrow 84. If desired, the holes 52 or 87 can be positioned in both the end plate 72 or 83 and the outer tube 26.

We claim:

1. In a spiral wound apparatus for filtering a fluid to produce a permeate and a retentate including a separation cartridge comprising at least one membrane, a plurality of porous feed screens and a plurality of porous permeate screens spirally wound about a central tube having a hollow interior, and a rigid solid end plate for controlling fluid flow through said separation cartridge, the improvement which comprises:

said separation cartridge having an outer fluid permeable wrap, said separation cartridge being housed within a rigid nonporous solid outer tube, said solid outer tube being housed within a solid housing spaced apart from said outer tube to form a space, means for controlling fluid flow through said space selected from the group consisting of holes through said rigid solid end plate, holes through said rigid solid outer tube, and holes through both the end plate and the outer tube, means for sealing said permeate from said retentate, said separation cartridge, outer tube and means for controlling fluid flow comprising a unitary construction.

2. The apparatus of claim 1 wherein said outer wrap comprises a feed screen.

3. The apparatus of claim 1 wherein said outer wrap comprises a permeate screen.

4. The apparatus of claim 1 wherein said means for controlling fluid flow comprises a plurality of bypass holes through an outer peripheral surface of said feed end plate and a flexible gasket which fits around the periphery of said end plate to effect fluid flow selectively through said bypass holes into said space.

5. The apparatus of claim 2 wherein said means for controlling fluid flow comprises a plurality of bypass holes through an outer peripheral surface of said feed end plate and a flexible gasket which fits around the periphery of said end plate to effect fluid flow selectively through said bypass holes into said space.

6. The apparatus of claim 3 wherein said means for controlling comprises a plurality of bypass holes through an outer peripheral surface of said feed end plate and a flexible gasket which fits around the periphery of said to effect fluid flow selectively through said bypass holes into said space.

* * * * *